(12) United States Patent
Chiu (10) Patent No.: US 10,883,883 B2
(45) Date of Patent: Jan. 5, 2021

(54) WIRELESS PROBE FOR FOOD, AND SYSTEM AND METHOD FOR WIRELESS FOOD TEMPERATURE REAL-TIME MONITORING

(71) Applicant: Manford Development Limited, Hong Kong (HK)

(72) Inventor: Kam Wing Chiu, Hong Kong (HK)

(73) Assignee: MANFORD DEVELOPMENT LIMITED, Hong Kong (HK)

( * ) Notice: Subject to any disclaimer, the term of this patent is extended or adjusted under 35 U.S.C. 154(b) by 0 days.

(21) Appl. No.: 16/258,701

(22) Filed: Jan. 28, 2019

(65) Prior Publication Data

US 2019/0250044 A1    Aug. 15, 2019

Related U.S. Application Data

(60) Provisional application No. 62/630,213, filed on Feb. 13, 2018.

(30) Foreign Application Priority Data

Apr. 12, 2018    (CN) .......................... 2018 1 0327693

(51) Int. Cl.
*G01K 1/02* (2006.01)
*H04W 4/38* (2018.01)
(Continued)

(52) U.S. Cl.
CPC ............ *G01K 1/024* (2013.01); *G01K 1/026* (2013.01); *G01K 13/12* (2013.01); *H04W 4/38* (2018.02);
(Continued)

(58) Field of Classification Search
None
See application file for complete search history.

(56) References Cited

U.S. PATENT DOCUMENTS

2005/0012627 A1*  1/2005  Lion ..................... G01K 1/024
                                                      340/584
2006/0016806 A1*  1/2006  Cristiani ............... G01K 13/00
                                                      219/749
(Continued)

FOREIGN PATENT DOCUMENTS

CN        1724979 A      1/2006
EP        1624724 A1     2/2006

OTHER PUBLICATIONS

Search Report of European Patent Application No. 19154108.5 dated Jul. 24, 2019.

*Primary Examiner* — John C Kuan (57) ABSTRACT

The present disclosure relates to a wireless probe for food, including a circuit board, a temperature sensor connected to electrical signals of the circuit board, a super capacitor and a wireless transmitter. The temperature sensor is used for measuring a temperature of the food. The super capacitor is used for supplying power to the circuit board. The wireless transmitter is used for broadcasting temperature signals measured by the temperature sensor in the form of wireless signals. The present disclosure also relates to a wireless food temperature real-time monitoring system, including the wireless probe for food, a mobile device and/or a wireless range extender for receiving the temperature signals transmitted from the wireless probe. A wireless food temperature real-time monitoring method is also disclosed. The present disclosure can monitor temperature of the food being cooked in real-time in order to better assist users in cooking.

5 Claims, 7 Drawing Sheets

(51) Int. Cl.
*G01K 13/12* (2006.01)
*G01K 1/08* (2006.01)

(52) U.S. Cl.
CPC ........... *G01K 1/08* (2013.01); *G01K 2207/02* (2013.01); *G01K 2207/06* (2013.01); *G01K 2215/00* (2013.01); *H04Q 2209/43* (2013.01)

(56) References Cited

U.S. PATENT DOCUMENTS

| | | | |
|---|---|---|---|
| 2015/0300887 A1 | 10/2015 | Mandava et al. | |
| 2016/0335874 A1* | 11/2016 | Allen, Sr. | H04Q 9/00 |
| 2016/0377490 A1* | 12/2016 | Nivala | G01K 13/00 |
| | | | 374/155 |
| 2017/0248474 A1* | 8/2017 | Nielsen | G01K 1/024 |
| 2018/0038737 A1* | 2/2018 | Hedlund | A47J 45/068 |
| 2018/0353003 A1* | 12/2018 | Sabata | A47J 36/00 |
| 2019/0041271 A1* | 2/2019 | Preston | G01K 1/026 |
| 2019/0049314 A1* | 2/2019 | Chu | G01K 1/08 |
| 2019/0195696 A1* | 6/2019 | Allen | G01K 1/024 |
| 2020/0062121 A1* | 2/2020 | Sato | B60L 1/00 |
| 2020/0096393 A1* | 3/2020 | Lion | G01K 1/024 |

\* cited by examiner

| Time | 0 | 5 | 10 | 15 | 20 | 25 | 30 | 35 | 40 | 45 | 50 | 55 | 60 | 65 | 70 | 75 | 80 | 85 | 90 | 95 | 100 | |
|---|---|---|---|---|---|---|---|---|---|---|---|---|---|---|---|---|---|---|---|---|---|---|
| Probe 49 Temp | 0 | 0 | 0 | 6 | 10 | 14 | 19 | 23 | 27 | 33 | 38 | 43 | 48 | 52 | 57 | 61 | 65 | 68 | 72 | 75 | 77 | All three probes reached the "Well Done" (71°C) temperature in 100 mins |
| Probe 49 Battery % | 100 | 100 | 100 | 100 | 100 | 100 | 100 | 100 | 100 | 100 | 99 | 98 | 96 | 94 | 91 | 87 | 83 | 78 | 70 | 62 | 56 | |
| Probe 23 Temp | 0 | 0 | 0 | 0 | 3 | 8 | 13 | 18 | 23 | 29 | 34 | 39 | 43 | 47 | 51 | 56 | 60 | 64 | 67 | 70 | 74 | |
| Probe 23 Battery % | 100 | 100 | 100 | 100 | 100 | 100 | 100 | 100 | 100 | 100 | 100 | 100 | 99 | 98 | 96 | 95 | 92 | 90 | 86 | 83 | 79 | |
| Probe 25 Temp | 0 | 0 | 0 | 0 | 2 | 8 | 13 | 17 | 23 | 28 | 33 | 39 | 45 | 50 | 55 | 60 | 65 | 69 | 73 | 77 | 81 | |
| Probe 25 Battery % | 100 | 100 | 100 | 100 | 100 | 100 | 100 | 100 | 100 | 99 | 98 | 96 | 94 | 90 | 86 | 81 | 72 | 62 | 54 | 47 | 39 | |

WIRELESS PROBE FOR FOOD, AND SYSTEM AND METHOD FOR WIRELESS FOOD TEMPERATURE REAL-TIME MONITORING

CROSS-REFERENCE TO RELATED APPLICATIONS

This application claims the benefit of U.S. Provisional Patent Application No. 62/630,213 filed on Feb. 13, 2018 and Chinese Patent Application No. 201810327693.3 filed on Apr. 12, 2018, the entire contents of which are hereby incorporated by reference.

TECHNICAL FIELD

The present disclosure relates to a temperature sensor for food, and more particularly to a wireless probe for food, and a system and method for wireless food temperature real-time monitoring.

BACKGROUND

Nowadays, food thermometers have been widely used to help people in cooking. People plug a food thermometer into food after cooking to determine whether the food has reached the desired cooking condition. However, this cannot give a real-time status of the food. Therefore, a so-call wireless food thermometer has been developed. Such kind of wireless food thermometer consists of three parts, namely a metal temperature sensor probe, a transmitter unit and a receiver/controller unit. Throughout cooking process, the metal temperature sensor probe is plugged into the food/meat which in turn is put inside, e.g. an oven, for cooking. The probe is then connected through a metal wire to the transmitter outside the oven to keep the electronic parts of the unit away from the heat. The communications between the transmitter and the receiver/controller unit are via a radio frequency link (RF link). With such design, a user can carry the receiver/controller unit to remotely monitor the status of the food. Since there is a wire connected between the probe and the transmitter unit, it creates some troubles to the user because the wire will tangle with rotisserie of an oven and prevent the oven door from completely closing.

SUMMARY

It is an object of the present disclosure to provide a wireless probe for food, and a system and method for wireless food temperature real-time monitoring that can monitor temperature of the food being cooked and better assist a user in cooking.

According to one aspect of the disclosure, there is provided a wireless probe for food, including a circuit board; a temperature sensor connected to electrical signals of the circuit board; a super capacitor; and a wireless transmitter, wherein the temperature sensor is used for measuring a temperature of the food, the super capacitor is used for supplying power to the circuit board, and the wireless transmitter is used for broadcasting temperature signals measured by the temperature sensor in the form of wireless signals.

In one embodiment, the wireless probe for food further includes a metal case, wherein the circuit board, the temperature sensor and the super capacitor are disposed within the metal case.

In one embodiment, the wireless probe for food further includes a ceramic cap, wherein the ceramic cap is covering a rear portion of the metal case, and the wireless transmitter is located inside the ceramic cap.

In one embodiment, the circuit board is provided with a first main processing unit and a first power management circuit, the wireless transmitter including a radio frequency circuit connected to the circuit board and an antenna connected to the radio frequency circuit.

According to another aspect of the disclosure, there is provided a wireless food temperature real-time monitoring system, including the above-mentioned wireless probe for food; a mobile device and/or a wireless range extender for receiving the temperature signals transmitted from the wireless probe.

In one embodiment, the wireless range extender includes a second main processing unit; a wireless receiver connected to the second main processing unit; and a wireless transceiver, wherein the wireless receiver is used for receiving the temperature signals transmitted from the wireless probe, and the wireless transceiver is used for communicating with the mobile device.

In one embodiment, the wireless range extender further includes a second power management circuit; and a wireless probe charging circuit connected to the second power management circuit, wherein the second power management circuit is connected to the second main processing unit, and the wireless probe charging circuit is configured to charge the wireless probe.

In one embodiment, the wireless range extender further includes an alert system connected to the second main processing unit, the alert system includes an indicating light and a sound-emitting device.

In one embodiment, the number of the wireless probe is one or more, the number of the wireless range extender is one or more, and the number of the mobile device is one or more.

According to yet another aspect of the disclosure, there is provided a wireless food temperature real-time monitoring method, including:
providing a wireless probe for food, the wireless probe for food including a circuit board provided with a first main processing unit and a first power management circuit; a temperature sensor connected to electrical signals of the circuit board; a super capacitor; and a wireless transmitter including a radio frequency circuit connected to the circuit board and an antenna connected to the radio frequency circuit;
measuring a temperature of the food by the temperature sensor after inserting the wireless probe into the food;
broadcasting temperature signals measured by the temperature sensor in the form of wireless signals by the wireless transmitter; and
receiving the temperature signals transmitted from the wireless probe by a mobile device and/or a wireless range extender.

In one embodiment, the receiving step includes receiving the temperature signals transmitted from the wireless probe by a wireless receiver connected to a second main processing unit provided on the wireless range extender.

In one embodiment, the wireless food temperature real-time monitoring method further includes the step of communicating between the wireless range extender and the mobile device by a wireless transceiver provided on the wireless range extender.

In one embodiment, the wireless food temperature real-time monitoring method further includes the step of charging the wireless probe by a wireless probe charging circuit connected to a second power management circuit, which is in turn connected to the second main processing unit provided on the wireless range extender.

In one embodiment, the wireless food temperature real-time monitoring method further includes the steps of providing an alert system connected to the second main processing unit of the wireless range extender; and alerting a user by alert signals generated by the alert system.

In one embodiment, the alert system includes an indicating light and a sound-emitting device.

In one embodiment, the wireless food temperature real-time monitoring method further includes the step of disposing the circuit board, the temperature sensor and the super capacitor within a metal case.

In one embodiment, the wireless food temperature real-time monitoring method further includes the step of covering a rear portion of the metal case with a ceramic cap such that the wireless transmitter is located inside the ceramic cap.

In one embodiment, the number of the wireless probe is one or more, the number of the wireless range extender is one or more, and the number of the mobile device is one or more.

A wireless probe for food according to an embodiment of the present disclosure has the following advantages: the wireless probe, and the system and method for wireless food temperature real-time monitoring can avoid the trouble of wiring. It can monitor the temperature of food being cooked in real-time in order to better assist users in cooking.

BRIEF DESCRIPTION OF THE DRAWINGS

The present disclosure will be further described below in conjunction with the accompanying drawings and embodiments, in which.

DETAILED DESCRIPTION

For a better understanding of the technical features, objects, and advantages of the present disclosure, some embodiments of the present disclosure will be described in detail with reference to the accompanying drawings.

Embodiments of the wireless probe for food and the wireless food temperature real-time monitoring system and method of the present disclosure are described in detail below, and examples of the embodiments are illustrated in the accompanying drawings, in which the same or similar reference numerals indicate the same or similar components or components having the same or similar function.

Figure 1:
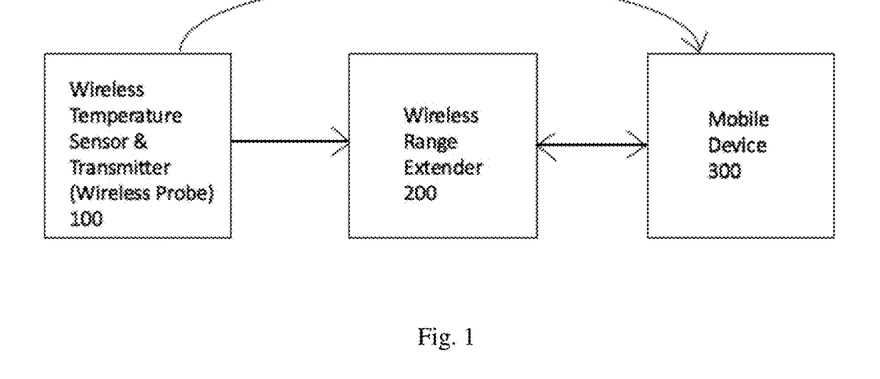
FIG. 1 is a block diagram of a wireless food temperature real-time monitoring system according to an embodiment of the present disclosure.
Figure 2A:
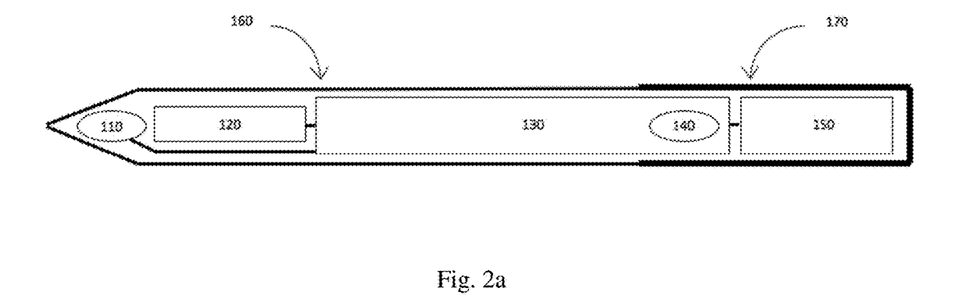
FIG. 2a is a schematic structural view of a wireless probe for food according to an embodiment of the present disclosure.
Figure 2B:
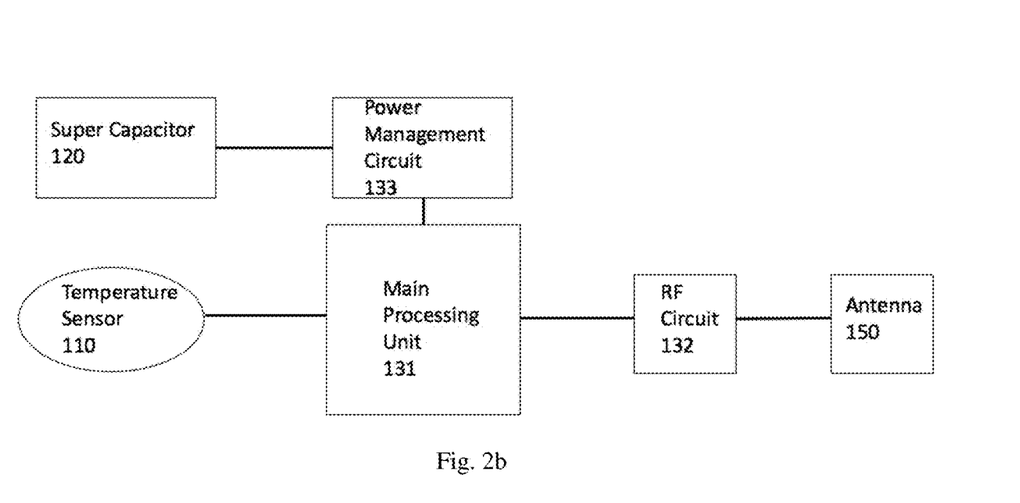
FIG. 2b is a system configuration diagram of the wireless probe for food according to an embodiment of the present disclosure.

FIG. 1 shows an embodiment of a wireless food temperature real-time monitoring system of the present disclosure. The wireless food temperature real-time monitoring system of the embodiment may include a wireless probe 100, a mobile device 300, and a wireless range extender 200. Referring to FIGS. 2a and 2b, the wireless probe 100 may include a circuit board 130, a temperature sensor 110 connected to the circuit board 130 via electrical signals, and a wireless transmitter. The wireless transmitter may include a radio frequency (RF) circuit 132 and an antenna 150. The wireless probe 100 may further include a super capacitor 120 for supplying electricity. The supper capacitor 120 can provide electricity to the temperature sensor 110 and the wireless transmitter. The temperature signals generated by the radio frequency circuit 132 can be broadcast by the antenna 150. The radio frequency signals broadcast by the antenna 150 may be received by the mobile device 300. The mobile device 300 can display food temperature information by a software application (APP) running in the mobile device 300, and can provide alert signals set in accordance with the software application. The alert signal may include: alert to notify a user of overcook or overheat, the radio frequency signals from the wireless probe 100 are out of range, the power of the wireless probe 100 is too low, and notify the user to finish cooking immediately, the cooking time is too long, no temperature change for a long period of time, etc. The mobile device 300 may be a mobile phone, a tablet or any portable electronic device. The mobile device 300 may have the capability of receiving the radio frequency signals broadcast by the wireless probe 100 and the wireless range extender 200, and the ability to run the software application.

The wireless probe 100 can be used to monitor the internal temperature of the food being cooked, and wirelessly broadcast the measured food temperature and related data to the wireless range extender 200 and the mobile device 300.

The wireless range extender 200 can receive the radio frequency data broadcast by the wireless probe 100, process the data and then send it to a paired mobile device 300, such as a mobile phone, a tablet or any portable electronic device. In addition, the wireless range extender 200 can support the charging of the wireless probe 100 with a built-in battery. The wireless range extender 200 can be powered by an external USB power adapter. It should be understood that the wireless range extender 200 can also be powered by its own battery. The battery can be a rechargeable battery.

The mobile device 300 can be used to display temperature of the food. The mobile device 300 can be a mobile phone, a tablet or any portable electronic device that has the ability to receive radio frequency signals broadcast by the wireless probe 100 and the wireless range extender 200, and the ability to run the software application. The mobile device 300 can wirelessly receive data from the wireless probe 100 or the wireless range extender 200. The software application can be installed in the mobile device 300, and the software application can decrypt the signals from the wireless probe 100 or the wireless range extender 200, and then display temperature of the food accordingly.

Figure 3:
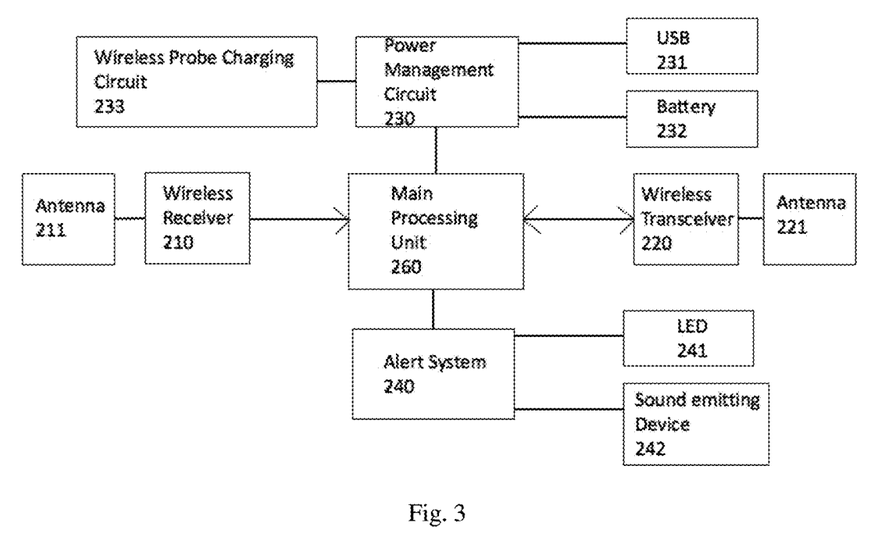
FIG. 3 is a system configuration diagram of a wireless range extender of the wireless food temperature real-time monitoring system according to an embodiment of the present disclosure.

In some embodiments, if a user wants to move away from a cooking location, the user can use the wireless range extender 200 to extend the monitoring range. The wireless receiver 210 in the wireless range extender 200 can pick up the radio frequency signals and re-transmit them to another wireless range extender 200 or a nearby paired mobile device 300. The mobile device 300 with the software application can receive radio frequency signals from the wireless probe 100 and the wireless range extender 200. Through the wireless range extender 200, the mobile device 300 not only can obtain food temperature information from the wireless probe 100, but can also send control signals to the wireless range extender 200 to perform temperature monitoring activities.

Referring to FIGS. 2a and 2b, the wireless probe 100 can broadcast the food temperature information to the wireless range extender 200 and the mobile device 300, which can include the following components:

Temperature sensor 110: The temperature sensor 110 can be used for measuring temperature of the food. The temperature sensor 110 may include one, two or more thermal sensors to detect temperatures at different locations of the food.

Super capacitor 120: The super capacitor 120 can be used for storing electrical power and supplying the power to the electronic circuits of the circuit board 130. The super capacitor 120 needs to be charged through the circuit board 130 before starting the temperature measurement.

Figure 9:
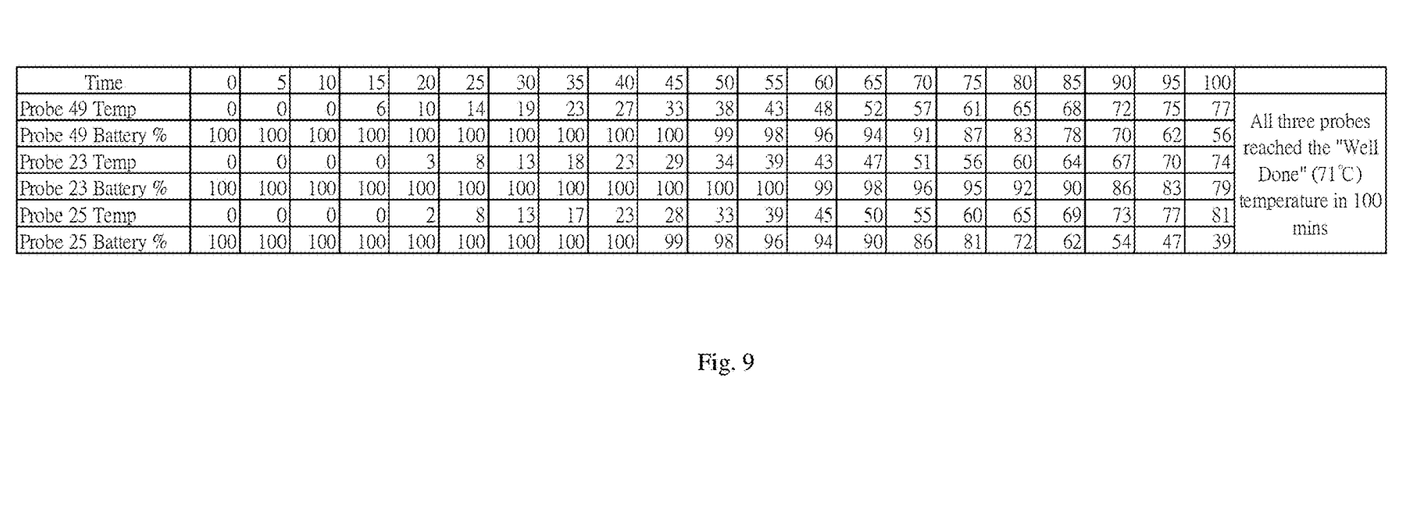
FIG. 9 shows a baking test result using the wireless probe of the present disclosure.
Figure 10:
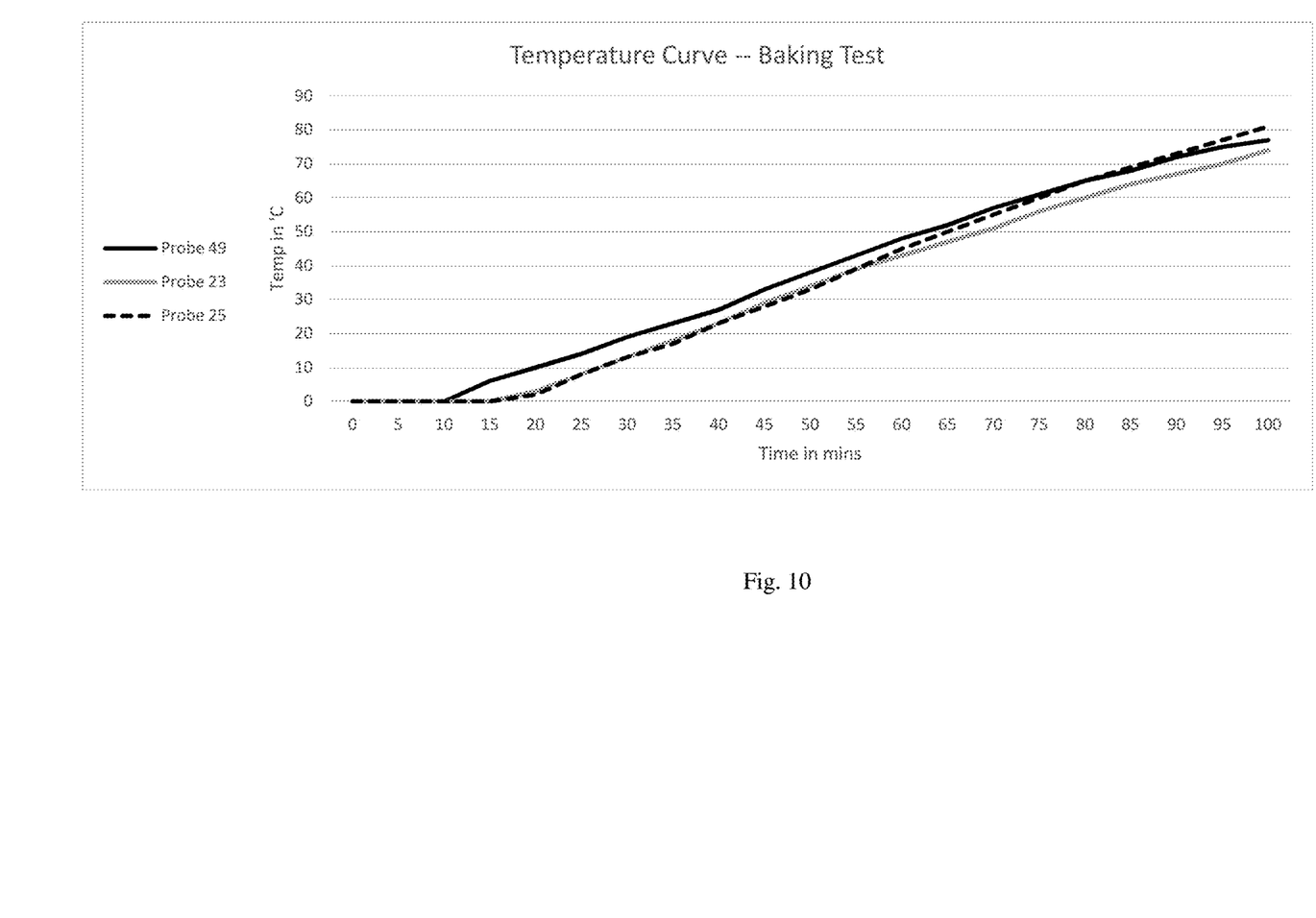
FIG. 10 shows a temperature curve of the baking test.
Figure 11:
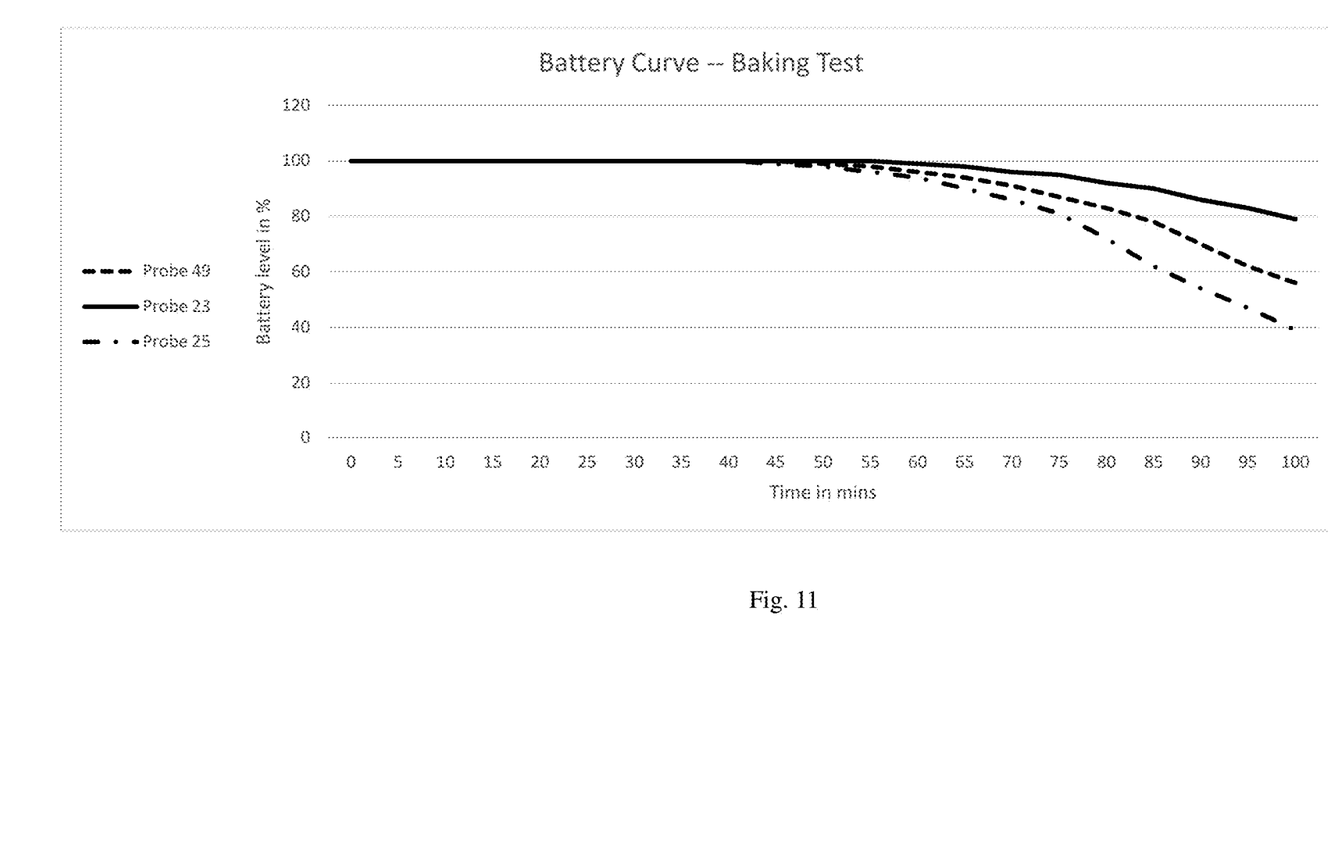
FIG. 11 shows a battery curve of the baking test.

In an application test, three wireless probes 49, 23, 25 were inserted into a pig's knuckle and the pig's knuckle was cooked in an oven at 180° C. After 100 minutes, the pig's knuckle was cooked to "Well Done", as shown in a baking test result in FIG. 9 and a temperature curve in FIG. 10. The battery levels of the three wireless probes were still in satisfactory levels, as shown in a battery curve in FIG. 11. Therefore, the super capacitor 120 of the wireless probe of the present disclosure can provide sufficient energy for normal cooking.

Capacitors are commonly used in different industries for filtering, resonant circuit and backup power but not commonly used as the main power source because of its limited power/energy. However, the circuit design has been optimized in order to minimize the operating power consumption as well as the leakage current. To further minimize the operating power consumption, the duty cycle and the instruction sets for sending digital signal via Bluetooth BLE broadcasting mode have also been optimized.

Circuit board 130: The circuit board 130 can be a controller board that may include a wireless controller chip for processing temperature measurement from the temperature sensor 110, wireless transmission, and super capacitor charging power management. The circuit board 130 may have connection pins connected to the metal case 160 as grounding, which can be used as one of the signals for charging.

Charging pole 140: The charging pole 140 can be used for charging the super capacitor 120.

Antenna 150: The antenna 150 can be used for converting electrical signals into wireless signals.

Metal case 160: The metal case 160, as a heat conductor, can transfer heat from outside to the temperature sensor 110. In use, the metal case 160 can be inserted into the food.

Ceramic cap 170: The ceramic cap 170 can be a ceramic component for thermal protection. The ceramic cap 170 may protrude outside the food and work in a high temperature environment.

Circuit board 130: The circuit board 130 can be a controller board that can handle temperature monitoring, power management, and radio frequency transmission. The circuit board 130 may include a main processing unit 131, a radio frequency circuit 132, and a power management circuit 133. During operation, the main processing unit 131 may be used to control the power management circuit 133. The power management circuit 133 can manage the charging of the super capacitor 120 and the power consumption of the circuit board 130. The idle of the system, the sensing of temperature, and the timing control of transmission can be controlled by the power management circuit 133. The main processing unit 131 can receive temperature data from the temperature sensor 110. The temperature data can be encrypted by the main processing unit 131, and then sent to the radio frequency circuit 132 for data transmission. The radio frequency circuit 132 can transmit the data via the antenna 150.

As shown in FIG. 3, the wireless range extender 200 can be used to re-transmit the data transmitted from the wireless probe 100 in order to extend the wireless coverage range. It may also include a charger for charging the wireless probe 100. The wireless range extender 200 may include the following components:

Wireless receiver 210 and antenna 211: The antenna 211 and the wireless receiver 210 can be used to receive signals transmitted from the wireless probe 100. The data can be decrypted by a main processing unit 260. The main processing unit 260 can support the receiving of data from one or more wireless probes 100.

Wireless transceiver 220 and antenna 221: The wireless transceiver 220 and the antenna 221 can be used for transmitting and receiving data to/from the mobile device 300. Data collected from the wireless probe 100 can be processed in the main processing unit 260. The data can be transmitted to the wireless transceiver 220 and the antenna 221, and then transmitted to the mobile device 300. The wireless transceiver 220 and the antenna 221 can also receive control command data from mobile device 300. In addition, the main processing unit 260 can also work as a master device to control a power management circuit 230 and an alert system 240.

Power management circuit 230: The power management circuit 230 can be used for charging the wireless probe 100. It can be connected to a wireless probe charging circuit 233. The power management circuit 230 can receive power from a USB 231 or a battery 232. It may include switches for switching the power on and off for probe detection purposes.

Once the wireless probe 100 is placed in a recessed charging region of the power management circuit 230, the power management circuit 230 can determine whether the wireless probe 100 is placed in a proper position. Once the wireless probe 100 is in a proper position, the charging process begins. When the charging is completed, the power management circuit 230 stops charging.

Alert system 240: The alert system 240 may include an LED 241 and a sound-emitting device 242 to indicate the status of charge and wireless connection.

The wireless probe 100 can transmit data by broadcasting to extend the operation period of the wireless probe 100 in order to cover the cooking time. The power management scheme can ensure the operation of the wireless probe throughout the cooking process. The power management scheme can be implemented to reduce power consumption of the wireless probe 100 powered by the charged super capacitor.

Figure 4:
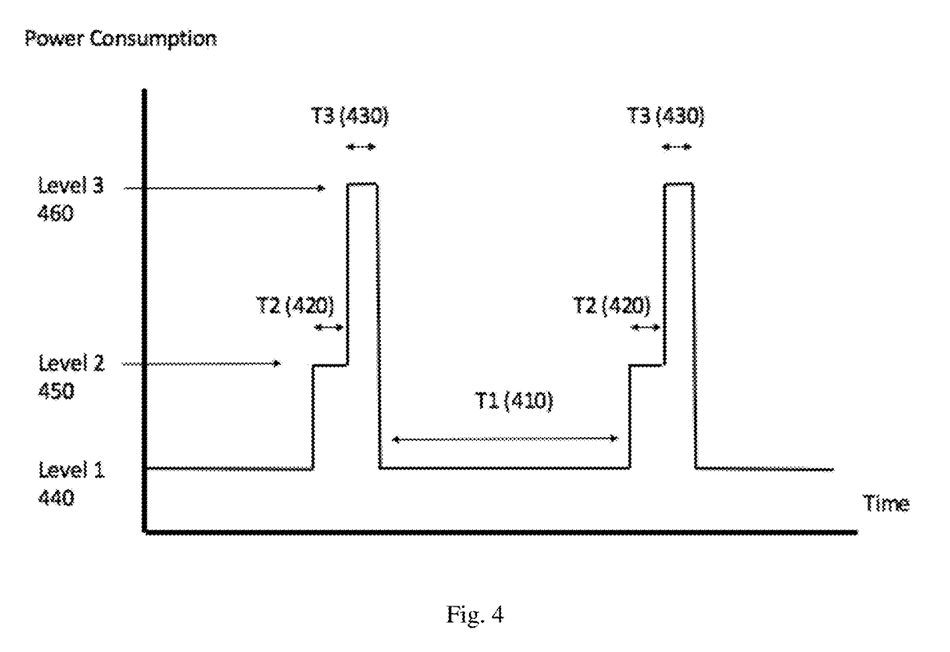
FIG. 4 is a power management timing diagram of a wireless probe for food according to the present disclosure.

FIG. 4 shows a power management scheme implemented by the wireless probe 100. T1 (410) represents the idle period of the wireless probe 100. Power consumption is kept at the lowest level 1 (440).

After the idle period T1 (410), the main processing unit 131 can start to run and detect temperature via the temperature sensor 110. T2 (420) is the temperature detection time when the power consumption is at level 2 (450). This is the detection period.

After the detection period, the main processing unit 131 can turn off the temperature sensor 110 and turn on the radio frequency circuit 132. The data can be sent via the antenna 150. The sending period is T3 (430) and the power consumption is at level 3 (460). This is the transmission period.

After the transmission period, the wireless probe 100 can return to the sleep mode. After a period of time T1 (410), it can be activated again. The wireless probe 100 consumes power during the transmission period and consumes less power during the idle period.

Different communication topologies may be used in the present application. The simplest topology is shown in FIG. 1, which is one-to-one communication. The mobile device 300 can directly receive broadcast signals from the wireless probe 100. There is another one-to-one communication topology in the presence of a wireless range extender 200. The food temperature data can be broadcast by the wireless probe 100 via radio frequency signals. The wireless range extender 200 can receive the radio frequency signals and re-transmit the food temperature data to the mobile device 300.

Figure 5:
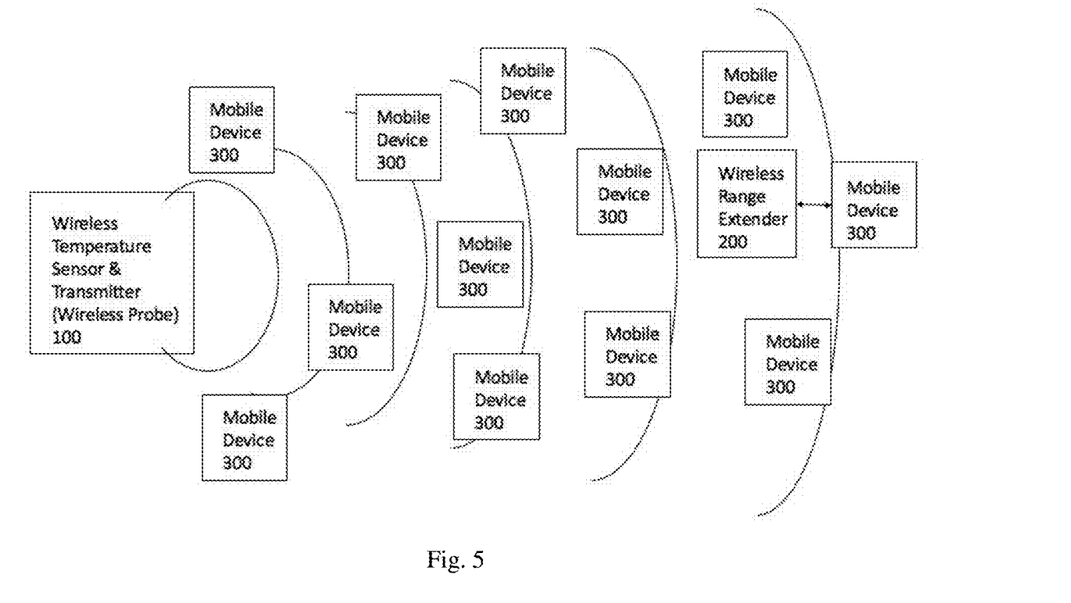
FIG. 5 shows a block diagram of a topology of one wireless probe-to-many mobile devices.

The broadcast signal of one wireless probe 100 can be received by many mobile devices 300 and wireless range extenders 200 paired with the mobile devices 300. FIG. 5 shows one wireless probe 100 broadcasting data, and eleven mobile devices 300 receiving signals. The wireless range extender 200 paired with the mobile device 300 can also receive the data. It should be understood that FIG. 5 is only an example, and the number of the mobile devices 300 and wireless range extenders 200 that receive the data may be unlimited.

Figure 6:
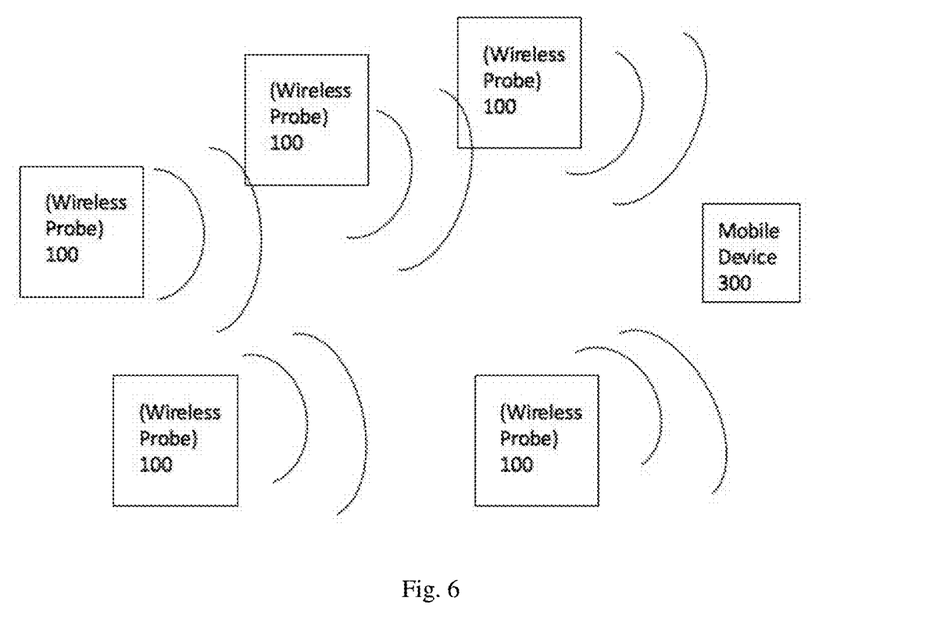
FIG. 6 shows a block diagram of a topology of many wireless probes-to-one mobile device.

On the other hand, broadcast signals from many wireless probes 100 can be received by one mobile device 300. FIG. 6 shows five wireless probes 100 broadcasting data and one mobile device 300 receiving all of the signals. It is to be understood that FIG. 6 is only an example, and the number of the wireless probes 100 broadcasting data to be received by the mobile device 300 may be unlimited.

Figure 7:
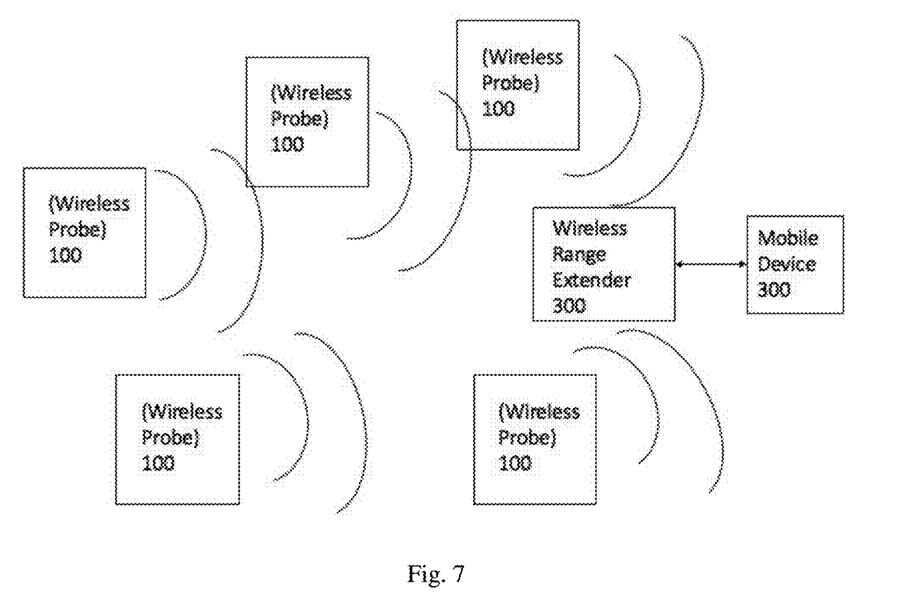
FIG. 7 shows a block diagram of a topology of many wireless probes-to-one wireless range extender paired with one mobile device.

The broadcast signals from the wireless probe 100 can also be received by the wireless range extender 200 that is paired with the mobile device 300. FIG. 7 shows five wireless probes 100 broadcasting data and one wireless range extender 200 paired with one mobile device 300 which receives all the signals. It is to be understood that FIG. 7 is only an example, showing multiple wireless probes 100, broadcasting data to be received by the wireless range extender 200 paired with the mobile device 300.

Figure 8:
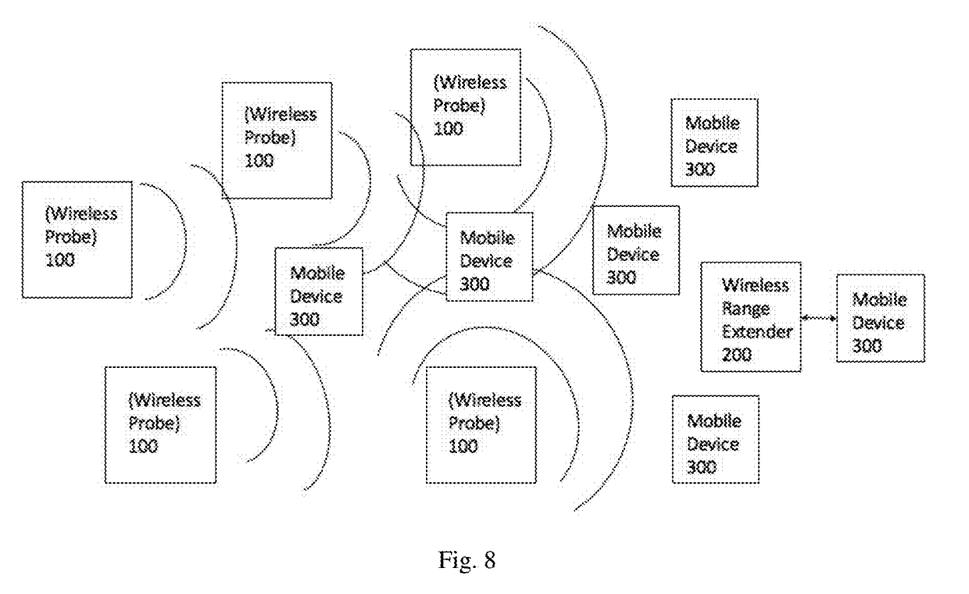
FIG. 8 shows a block diagram of a topology of many wireless probes-to-many mobile devices.

Broadcast signals from many wireless probes 100 may also be received by many mobile devices 300 and many wireless range extenders 200 paired with the mobile devices 300. FIG. 8 shows five wireless probes 100, five mobile devices 300, and one wireless range extender 200 paired with one mobile device 300 which receives all the signals. It is to be understood that FIG. 8 is only an example, depicting multiple wireless probes 100, mobile devices 300, and wireless range extenders 200 paired with the single mobile device 300.

Conventional bimetal thermometers are analogue devices that require a user to stand close to the thermometer to read the temperature reading. The temperature reading cannot be captured, transmitted and stored for further process. In the present disclosure, the temperature reading can be captured in real time, sent out via wireless link and stored in mobile phone or mobile device for further process and manipulation. This can help the user during cooking or for future reference (i.e. learning). Therefore, with the present disclosure, the user is not required to stay very close to an oven during the whole cooking process. The temperature data received in the mobile phone/mobile device can help the user to automatically monitor the food status, provide notification to the user when the temperature is close to the target temperature, and ask the user to attend to the cooking in the oven.

In addition, in the present disclosure, a lot of additional features can be implemented such as time reminder, temperature reminder, cooking curve recording, preset target temperature according to the type of meat, cut of meat and target doneness can be implemented in the mobile App. Alerts and notifications can be used to remind the user. Moreover, the cook setting and cooking results can be shared on social media.

The embodiments of the present disclosure have been described above with reference to the drawings. However, the present disclosure is not limited to the specific embodiments described above. The specific embodiments described above are merely illustrative and not restrictive. Those skilled in the art with the teaching of the present disclosure may come up with various modifications that would fall within the scope of protection of the present disclosure without departing from the spirit and scope of the appending claims.

What is claimed is:

1. A wireless food temperature real-time monitoring system, comprising:
  a wireless probe to monitor temperature of the food, comprising
    a circuit board, wherein the circuit board is provided with a first main processing unit and a first power management circuit;
    a temperature sensor connected to electrical signals of the circuit board;
    a super capacitor; and
    a wireless transmitter, the wireless transmitter comprising a radio frequency circuit connected to the circuit board and an antenna connected to the radio frequency circuit;
      wherein the temperature sensor is used for measuring a temperature of the food, the super capacitor is used for supplying power to the circuit board, and the wireless transmitter is used for broadcasting temperature signals measured by the temperature sensor in the form of wireless signals, wherein the first power management circuit manages charging of the super capacitor and power consumption of the circuit board, wherein further the wireless probe consumes a lowest level of power during an idle period, a middle level of power during a temperature signal detection period, and a highest level of power during a transmission period, the idle period has a longer duration than the temperature signal detection period and the transmission period;

a wireless range extender for receiving the temperature signals transmitted by the wireless probe, wherein the wireless range extender is configured to extend monitoring range; and a mobile device for receiving the radio frequency signals broadcast by the wireless probe and the wireless range extender, wherein the wireless range extender is configured to receive control signals from the mobile device to perform temperature monitoring activities and is configured to support the charging of the wireless probe, wherein further the mobile device provides notification when the temperature is close to a target temperature;

wherein the wireless probe comprises a metal case, wherein further the circuit board, the temperature sensor and the super capacitor are disposed within the metal case;

wherein the wireless probe comprises a ceramic cap, wherein further the ceramic cap is covering a rear portion of the metal case, and the wireless transmitter is located inside the ceramic cap.

2. The wireless food temperature real-time monitoring system according to claim 1, wherein the wireless range extender comprises:

a second main processing unit;

a wireless receiver connected to the second main processing unit;

a wireless transceiver, wherein the wireless receiver is used for receiving the temperature signals transmitted from the wireless probe; and the wireless transceiver is used for communicating with the mobile device.

3. The wireless food temperature real-time monitoring system according to claim 2, wherein the wireless range extender further comprises:

a second power management circuit; and a wireless probe charging circuit connected to the second power management circuit;

wherein the second power management circuit is connected to the second main processing unit, and the wireless probe charging circuit is configured to charge the wireless probe.

4. The wireless food temperature real-time monitoring system according to claim 2, wherein the wireless range extender further comprises an alert system connected to the second main processing unit, wherein the alert system comprises an indicating light and a sound-emitting device.

5. The wireless food temperature real-time monitoring system according to claim 1, wherein number of the wireless probe is one or more, number of the wireless range extender is one or more, and number of the mobile device is one or more.

* * * * *